United States Patent
Scinta

[15] 3,660,862
[45] May 9, 1972

[54] WIPER ARM

[72] Inventor: Anthony C. Scinta, Hamburg, N.Y.

[73] Assignee: Trico Products Corporation, Buffalo, N.Y.

[22] Filed: Apr. 24, 1970

[21] Appl. No.: 31,492

[52] U.S. Cl. .................................... 15/250.23, 15/250.32
[51] Int. Cl. ........................................................ B60s 1/40
[58] Field of Search ................. 15/250.23, 250.32, 250.34, 15/250.35

[56] References Cited

UNITED STATES PATENTS

| | | | |
|---|---|---|---|
| 2,286,004 | 6/1942 | O'Shei | 15/250.32 X |
| 2,576,809 | 11/1951 | Rappl | 15/250.32 |
| 3,453,679 | 7/1969 | Thorlakson | 15/250.32 X |

FOREIGN PATENTS OR APPLICATIONS

| 772,971 | 4/1957 | Great Britain | 15/250.23 |
|---|---|---|---|

Primary Examiner—Peter Feldman
Attorney—E. Herbert Liss

[57] ABSTRACT

A blade supporting arm connector for releasably attaching a wiper blade to a wiper arm is pivotally secured to the free end of the wiper arm about an axis perpendicular to an associated windshield and is spring urged by a torsion spring, a tension spring, or a hairpin type spring to pivot relative to the longitudinal axis of the arm assembly to a position where it presents the blade with the longitudinal axis of the blade angularly displaced from the longitudinal axis of the arm. The blade connector may be a cantilever pin type element for releasably engaging a receptor in a blade superstructure or a bayonet type element for reception in a bayonet clip. In certain modifications a housing, sector shaped in lateral cross section, lined with anti-friction sheet material, is secured to the end of the arm and encloses the end of the blade connector. A cushioning element may be disposed on each side of the enclosed portion of the arm connector. In other modifications a similar housing is secured to the inner end of the blade supporting connector and encloses the free end of the arm. A housing is not included in all modifications.

8 Claims, 9 Drawing Figures

PATENTED MAY 9 1972

INVENTOR.
ANTHONY C. SCINTA

BY E. Herbert Liss

ATTORNEY.

INVENTOR.
ANTHONY C. SCINTA
BY E. Herbert Liss
ATTORNEY.

WIPER ARM

BACKGROUND OF THE INVENTION

The present invention relates to a wiper arm assembly and more particularly to an articulated wiper arm assembly.

Newer type windshields are severely inclined rearwardly from the cowl to the roof line. The lateral outboard edges converge to form a windshield which is substantially wider at the base or lower edge adjacent the cowl of the vehicle than at the top or upper edge adjacent the roof line of the vehicle. With these newer type windshields if the longitudinal axis of the blade is held fixed with respect to the longitudinal axis of the arm on an axis perpendicular to the glass as the wiper oscillates in an arcuate path, a substantial unwiped angular area is left at the outboard viewing area of the windshield. This occurs because the inner end of the blade traverses a smaller arc than the outer end of the blade.

To overcome this problem there has been developed compound oscillating windshield wiper arm assemblies which include a drag link pivotally connected at an axis parallel to the main pivot shaft at its inner end and either to a pivot block at the outer end of the arm or to the wiper blade itself. Such a construction effects pivotal movement of the blade relative to the axis of the arm, as for example, the windshield wiper illustrated in U.S. Pat. No. 3,247,540 issued Apr. 26, 1966 by S. J. Howard and R. A. Deibel, assigned to the assignee of the present invention. Another discloser of such a wiper arm appears in U.S. Pat. No. 3,418,678 by A. C. Scinta and R. A. Deibel issued Dec. 31, 1968 and assigned to the assignee of the present invention. Under some circumstances, for economy or space considerations, it may be desirable to avoid the use of a drag link.

SUMMARY

The wiper arm assembly of the present invention accomplishes the articulation required to wipe the lower outboard corners of a windshield by pivotally securing a blade supporting connector to the free end of the wiper arm. Spring biasing means acting between the wiper arm and the pivotally secured blade supporting connector is employed to effect relative angular movement between the longitudinal axis of the arm and the longitudinal axis of the blade as the wiper oscillates. Thus the blade when operating in its wiping path is biased to a position where the blade wipes the lower outboard corners of the windshield. The spring biasing means is yieldable to the force applied for moving the wiper assembly in its wiping path. Thus when the blade engages the lower molding of the windshield or other stop means which may be provided at the lower edge of the windshield, it is pivoted on its axis against the urging of the spring biasing means to a position parallel to the lower molding or other stop means.

The principal object of the present invention is to provide an improved wiper arm assembly which moves an attached blade from a position parallel to the lower molding to an angular position capable of wiping the lower outboard corner of an inclined windshield with a minimum number of parts and which minimizes the obstruction of the operator's viewing area.

Other objects and advantages of the invention will be apparent from the following detailed description taken in connection with the accompanying drawings.

DESCRIPTION OF THE PREFERRED EMBODIMENTS

Figure 1:
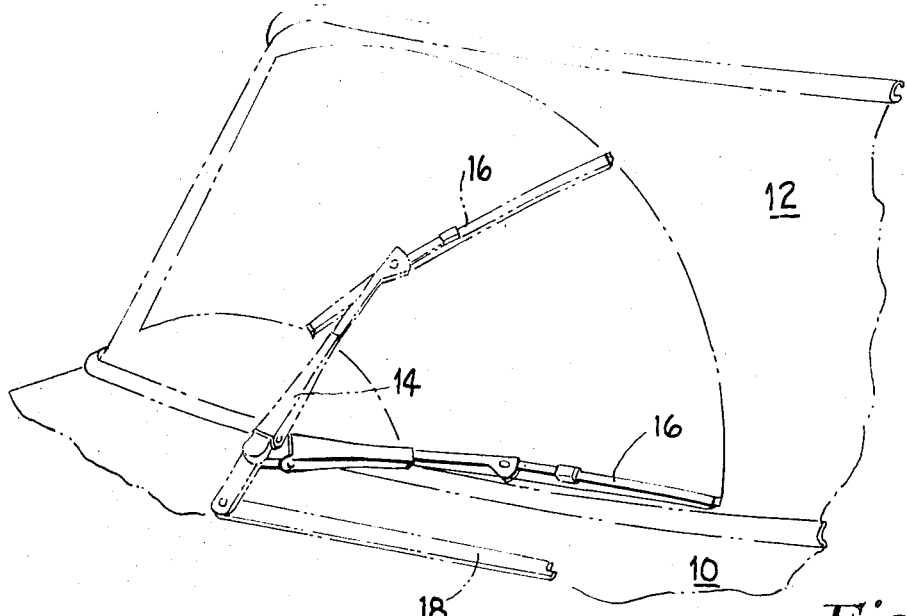
FIG. 1 is a partial perspective view of a motor vehicle embodied in the invention.
Figure 2:
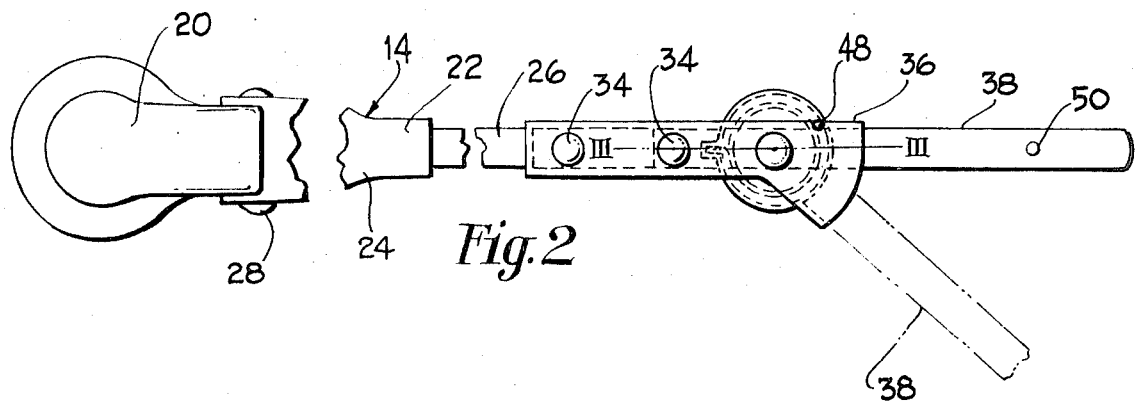
FIG. 2 is a top elevational view of one form of wiper arm assembly.
Figure 3:
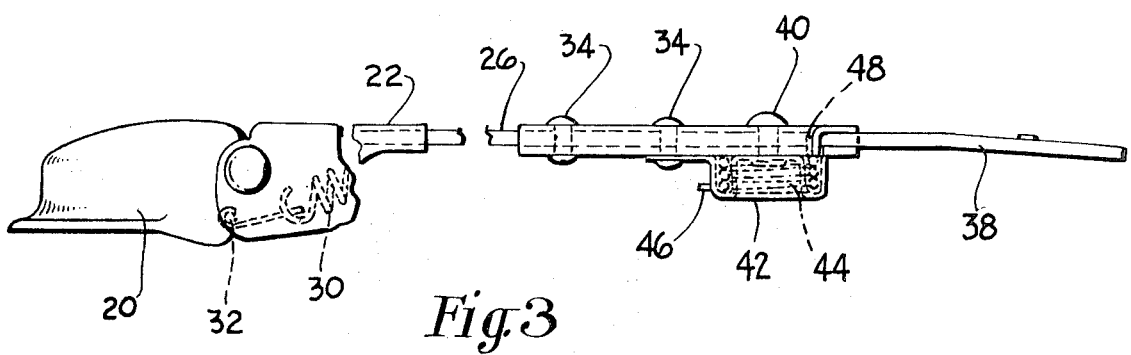
FIG. 3 is a side elevational view taken on line III—III of FIG. 2 of the wiper arm assembly.

In FIG. 1 there is shown a fragment of a motor vehicle 10 having a contoured panoramic windshield 12. Mounted on an oscillating shaft (not shown) extending through the cowl of the vehicle 10 there is a wiper arm assembly 14 having connected thereto a blade 16. The arm and blade assembly may be oscillated in the well known manner by a motor through a linkage transmission 18. The arm 14 and blade 16 is shown in solid lines in an inboard position, abutting the lower molding and in dotted lines in an intermediate position. Referring to FIGS. 2 and 3 the wiper arm assembly 14 comprises a mounting head 20 constituting means for mounting the assembly on a vehicle pivot shaft. The mounting head assembly 20 is pivotally connected to an elongate arm extension assembly 22 including a spring retainer 24 and an outer arm extension 26. The arm extension assembly 22 is pivoted on a transverse axis through rivet 28 to mounting head 20 and is biased toward the windshield by an arm biasing spring 30 acting between its connection 32 at the mounting head 20 and a connection (not shown) on the arm extension assembly 22. Although a specific wiper arm mounting head and outer arm assembly is shown and described for the purpose of illustration, it will of course be understood that in accordance with the broader aspects of the invention, other and different types of wiper arms may be utilized.

Rigidly secured in any suitable manner as, for example, by rivets 34 to the free or outer end of the arm extension 26 is a housing 36 having a portion sector shaped in lateral cross section. Blade supporting means comprising a flat stock blade supporting connector 38 may have its inner end disposed within the sector shaped portion of the housing 36 and may be pivotally secured therein on a vertical axis through rivet 40. A cylindrical cup shaped housing 42 is secured to the under side of the housing 36 with its side walls circumscribing the axis through the rivet 40. Confined within the housing 42 is a torsion spring 44 having one end 46 extending through an opening and engaging the cylindrical wall of the housing 42. Its other end 48 extends upwardly into engagement with an edge of blade supporting connector 38. The torsion spring 44 is positioned to urge the connector 38 in a clockwise direction from the position shown in full line in FIG. 1 to the position shown in dotted lines in FIG. 4. The flat stock connector 38 has a projection 50 formed on its upper surface constituting a shoulder for engagement with a complementary aperture forming a shoulder on a connecting clip (not shown) of wiper blade 16. A bayonet connection of this type is shown in U.S. Pat. No. 3,056,160 by J. R. Oishei and A. C. Scinta issued Oct. 2, 1962 and assigned to the assignee of the present invention.

As is more clearly shown in FIGS. 6, 7, 8 and 9 described in detail hereinafter, the housing 36 may be lined with a suitable anti-friction material such as beryllium-copper to provide free pivotal movement for the blade supporting connector 38 and also to serve as a shim to prevent a loose fit. A hairpin-shaped cushioning device which may also be of beryllium-copper or other anti-friction material may have its apex surrounding the rivet 40 and its legs extending outwardly to the arcuate open end of the housing 36 intermediate the side walls of the housing and the edges of the blade supporting connector 38 to soften the engagement of the connector 38 with the side walls of the housing 36. The side walls of the housing 36 serve as stops to limit the pivotal movement of the blade supporting connector 38.

Thus when the arm assembly 14 is in a position where the blade bears against the lower molding of the windshield as shown in solid lines in FIG. 1, the blade connector is urged to the solid line position as shown in FIGS. 1 and 2 to present the blade 16 in an attitude parallel to the lower molding of the windshield. In this position the spring is loaded since it is yieldable to the force applied to move the arm assembly across its path. As the arm assembly moves outwardly from the above described position toward the dotted line position as shown in FIG. 1 the blade supporting connector 38 and associated wiper arm 14 is urged to pivot to the position shown in dotted lines in FIG. 2 with its longitudinal axis at an angle to the longitudinal axis of the arm assembly 14. Thus the blade path reaches and wipes the lower outboard corners of the windshield 12.

In FIGS. 4 through 9 additional embodiments of the invention are shown wherein the wiper arm mounting head and arm extension assembly may be identical with that shown in the embodiment illustrated in FIGS. 1 to 3. It will of course be understood that in accordance with broader aspects of the invention, the present invention may be embodied in any suitable type of wiper arm assembly. The invention is not limited to the specific mounting head and outer arm extension assembly shown and described.

Figure 4:
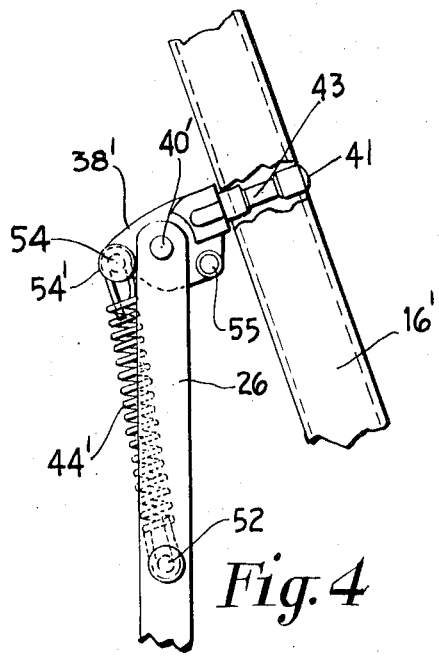
FIG. 4 is a fragmentary top elevational view of another modification of the invention.
Figure 5:
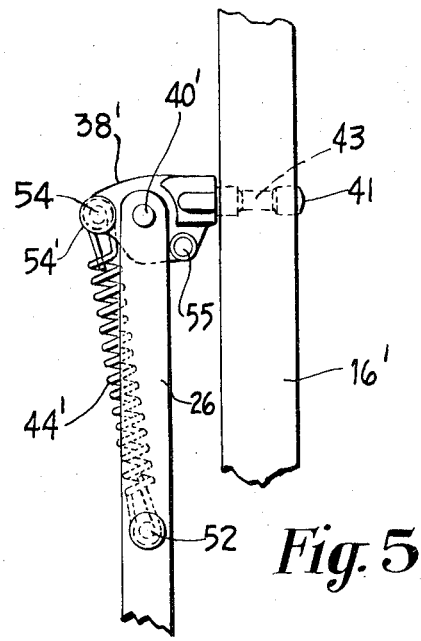
FIG. 5 is a view similar to FIG. 4 showing the spring in loaded condition.

The embodiment illustrated in FIGS. 4 and 5 includes a pivot block 38' pivotally secured to the free end of the outer arm extension 26 about an axis at 40' in any suitable or desirable manner. Rigidly secured, as shown, or formed integrally with the pivot block 38' is a cantilever pin 41 projecting therefrom having an annular groove 43. The pin 41 is adapted to be received in a complementary transverse receptor of a wiper blade 16' which includes latching means interlocking with the pin 41 to releasably retain the arm on the blade. Examples of such locking engagement are described in detail in U.S. Pat. No. 3,378,874 by A. C. Scinta, issued Apr. 23, 1968 and assigned to the assignee of the present invention. A coil spring 44' is secured at one end 50 to the arm extension 26 and at its other end it is secured at 54 to an extending portion of the pivot block 38'. The spring is relaxed when the blade moves to the position shown in FIG. 4 with its longitudinal axis displaced angularly from the longitudinal axis of the wiper arm and is in tension when the blade is in the position shown in FIG. 5. FIG. 5 illustrates the position of the blade when bearing against the lower molding of the windshield. FIG. 4 illustrates the position to which it moves as the blade traverses its arcuate path.

The stud 54' serves as a stop when the pivot block is in one extreme position as indicated in FIG. 4. The stud 55 serves as a stop in the other extreme position of the pivot block indicated in FIG. 5.

Figure 6:
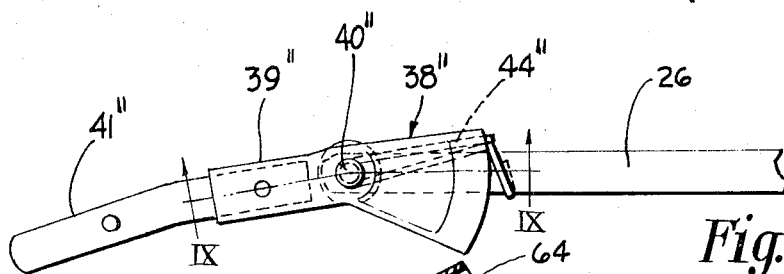
FIG. 6 is a fragmentary top elevational view of another form of the invention.
Figure 7:
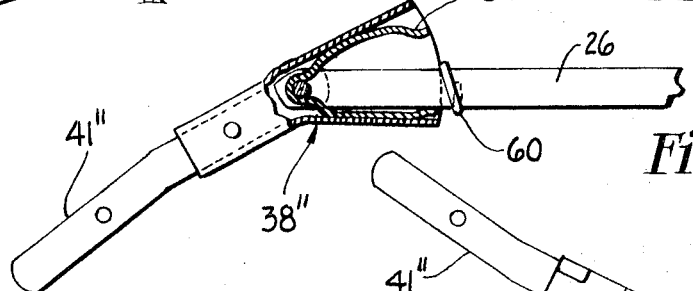
FIG. 7 is a view similar to FIG. 6, partly in section, showing the spring biasing means in loaded condition.
Figure 8:
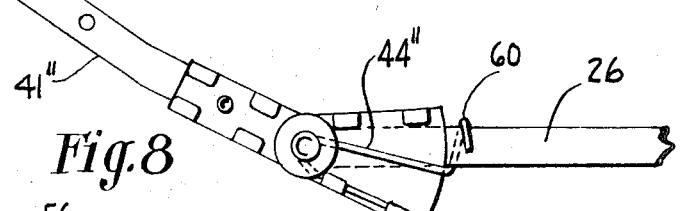
FIG. 8 is a bottom elevational view of a form of the invention shown in FIGS. 6 and 7.
Figure 9:
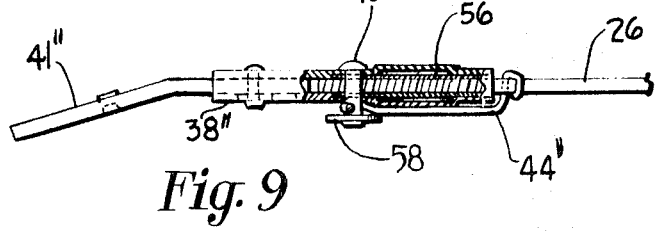
FIG. 9 is a longitudinal section taken on line IX—IX of FIG. 6 looking in a direction as indicated by the arrows.

The modification shown in FIGS. 6, 7, 8 and 9 incorporates a blade supporting connector assembly 38'' which includes a flat stock bayonet type blade connector element 41'' having secured thereto at its end adjacent the outer arm extension 26 a housing 39'' with a portion thereof crimped or retained in any other suitable or desirable manner as, for example, by staking or welding to the bayonet connector 41''. A portion of the housing 39'' is sector shaped in lateral cross section and receives through its arcuate end the adjacent end of the outer arm extension 26. The arm extension 26 is pivoted to the housing on an axis through rivet 40''. The sector section of the housing includes a lining 56 of suitable anti-friction material as, for example, beryllium-copper. The upper and lower surfaces of the liner 56 in addition to their functioning as anti-friction surfaces also function as shims to provide a stable assembly. The rivet forming axis 40'' extends through the housing and includes a portion projecting exteriorly of the lower surface. A hairpin type spring 44'' has its apex engaging the extended portion of the rivet 40' and is secured by a washer 58. One leg of the hairpin spring 44'' embraces an adjacent portion of the arm extension 26 as at 60. The other leg is retained rigid with the housing 39''', as for example by retaining ears 62. Within the housing a hairpin shaped cushioning element 64 of anti-friction material as, for example, beryllium-copper, has its apex embracing a portion of rivet 40'' within the housing and its legs extending outwardly toward the open arcuate end of the housing 39''. The end of the arm extension 26 within the housing 39'' lies between the legs of the cushioning element 64. The cushioning element 64 softens the engagement of the arm extension 26 as it pivots from one side wall of the housing 39' to the other. FIG. 6 shows the position of the blade connector assembly 38'' when the blade is bearing against the lower molding of a windshield with the hairpin spring 44'' loaded and urging the blade connector assembly 38' to the position shown in FIG. 7. When the blade leaves the position shown in FIG. 6 the blade connector assembly 38'' moves toward the position shown in FIG. 7.

Thus several embodiments of an articulated arm capable of lying flush against a lower molding or other stop means at the lower edge of the windshield and movable angularly so as to reach the outer lower corner of the windshield have been described. This movement is accomplished without the use of a separate drag link by utilizing spring biasing means acting between a pivotally attached blade supporting connector and a wiper arm extension.

Although certain specific embodiments of the invention have been shown and described for the purpose of illustration it will be apparent that various modifications and other embodiments are possible within the scope of the invention. It is to be understood, therefore, that the invention is not limited to the specific arrangements shown but in its broadest aspects it includes all equivalent embodiments and modifications which come within the scope of the invention.

What is claimed is:

1. A wiper arm assembly comprising mounting means for securing said arm assembly to an oscillating pivot shaft for effecting movement therewith in an arcuate path across the windshield, an elongate arm extension extending radially from said mounting means, blade supporting means pivotally attached at a vertical axis perpendicular to the plane of the windshield adjacent the end of said wiper arm remote from said mounting means for connecting a wiper blade to said arm, biasing means, yieldable to the force applied for moving said arm acting between said blade supporting means and said arm extension for urging said blade supporting means to pivot on said vertical axis, adjacent end portions of said blade supporting means and said arm extension at said vertical axis being disposed within a housing whereby said blade supporting means pivots relative to said arm extension and are stabilized as said blade supporting means moves to and from a loaded position adjacent the end of a stroke.

2. A wiper arm assembly according to claim 1 wherein said biasing means comprises a torsion spring.

3. A wiper arm assembly according to claim 1 wherein said biasing means comprises a hairpin spring.

4. A wiper arm assembly according to claim 1 wherein said blade supporting means comprises a member of flat stock including a terminal portion having a shoulder formed thereon adapted to be received in manually releasable engagement within an elongate clip member pivotally secured to a wiper blade.

5. A wiper arm assembly according to claim 1 wherein said housing is sector shaped in lateral section whereby the side walls thereof form stops to limit pivotal movement of the blade supporting means.

6. A wiper arm assembly according to claim 1 wherein the interior of said housing is lined with anti-friction material to thereby permit free pivotal movement of said blade supporting means and to serve as a stabilizing shim therefor.

7. A wiper arm assembly according to claim 1 including a cushioning device disposed within said housing, said cushioning device having a pair of arms disposed intermediate the edges of said flat arm extension and the side walls of said housing.

8. A wiper arm assembly according to claim 1 wherein said blade supporting means includes a housing secured thereto having a sector shaped portion for receiving a terminal portion of said arm extension in the region of said pivotal connection, said sector shaped portion including a lining of anti-friction material and a bumper means for cushioning the engagement between said arm extension and the side walls of said sector shaped portion.

* * * * *